(12) United States Patent
Matsui (10) Patent No.: US 12,391,550 B2
(45) Date of Patent: Aug. 19, 2025

(54) METHOD FOR PRODUCING BROMINE PENTAFLUORIDE

(71) Applicant: SHOWA DENKO K.K., Tokyo (JP)

(72) Inventor: Kazuma Matsui, Tokyo (JP)

(73) Assignee: Resonac Corporation, Tokyo (JP)

( * ) Notice: Subject to any disclaimer, the term of this patent is extended or adjusted under 35 U.S.C. 154(b) by 904 days.

(21) Appl. No.: 17/610,187

(22) PCT Filed: Sep. 10, 2020

(86) PCT No.: PCT/JP2020/034334
§ 371 (c)(1),
(2) Date: Nov. 10, 2021

(87) PCT Pub. No.: WO2021/070550
PCT Pub. Date: Apr. 15, 2021

(65) Prior Publication Data
US 2022/0219982 A1 Jul. 14, 2022

(30) Foreign Application Priority Data
Oct. 7, 2019 (JP) .................. 2019-184782

(51) Int. Cl.
*C01B 7/24* (2006.01)
*B01D 53/00* (2006.01)
(Continued)

(52) U.S. Cl.
CPC .............. *C01B 7/24* (2013.01); *B01D 53/002* (2013.01); *B01D 53/04* (2013.01); *B01J 19/14* (2013.01);
(Continued)

(58) Field of Classification Search
CPC ........ C01B 7/24; B01D 53/002; B01D 53/04; B01D 2253/112; B01D 2256/26;
(Continued)

(56) References Cited

FOREIGN PATENT DOCUMENTS

CN      107311110 A   * 11/2017
FR       1515212 A       3/1968
(Continued)

OTHER PUBLICATIONS

Iwasaki (Fluorination of bromine by fluorine, Kyoto University Research Institute, 1970) (Year: 1970).*

(Continued)

*Primary Examiner* — Sally A Merkling
*Assistant Examiner* — Logan Edward Laclair
(74) *Attorney, Agent, or Firm* — Sughrue Mion, PLLC (57) ABSTRACT

There is provided a method for producing high-purity bromine pentafluoride while leaving a less amount of an unreacted fluorine gas. The method for producing bromine pentafluoride includes a reaction step of feeding a bromine-containing compound, which is at least one of a bromine gas and bromine trifluoride, and a fluorine gas to a reactor to give a (fluorine atom):(bromine atom) molar ratio, that is, F/Br of 3.0 or more and 4.7 or less and reacting the bromine-containing compound and the fluorine gas to each other to obtain a reaction mixture containing bromine pentafluoride and bromine trifluoride; and a separation step of separating bromine pentafluoride and bromine trifluoride in the reaction mixture from each other.

19 Claims, 1 Drawing Sheet

(51) Int. Cl.
*B01D 53/04* (2006.01)
*B01J 19/14* (2006.01)
*B01J 19/24* (2006.01)
*B01J 20/04* (2006.01)
*B01J 21/04* (2006.01)
*B01J 27/128* (2006.01)

(52) U.S. Cl.
CPC ......... *B01J 19/2415* (2013.01); *B01J 20/046* (2013.01); *B01J 21/04* (2013.01); *B01J 27/128* (2013.01); *B01D 2253/112* (2013.01); *B01D 2256/26* (2013.01); *B01D 2257/204* (2013.01)

(58) Field of Classification Search
CPC ...... B01D 2257/204; B01D 2257/2062; B01D 2257/2066; B01D 53/0423; B01J 19/14; B01J 19/2415; B01J 20/046; B01J 21/04; B01J 27/128; B01J 35/56; B01J 8/065; B01J 8/067; B01J 15/005; B01J 27/12; B01J 27/125; C01P 2006/80
See application file for complete search history.

(56) References Cited

FOREIGN PATENT DOCUMENTS

| JP | 2017-190284 A | 10/2017 |
| JP | 2017197390 A | * 11/2017 |

OTHER PUBLICATIONS

Machine translation of JP2017197390A (Year: 2017).*
Machine translation of CN-107311110-A (Year: 2017).*
Iwasaki et al., "Reaction between Bromine and Fluorine", Nippon Kagaku Zassi, 1962, vol. 83, Issue 1, pp. 36-39 (4 pages total).
Kluksdahl et al., "The Reaction of Bromine Trifluoride and Fluorine to Form Bromine Pentafluoride", J. Am. Chem. Soc., 1959, vol. 81, pp. 5285-5286 (2 pages total).
International Search Report for PCT/JP2020/034334 dated Nov. 17, 2020 [PCT/ISA/210].
International Preliminary Report on Patentability with Translation of the Written Opinion dated Apr. 12, 2022 in International Application No. PCT/JP2020/034334.
Carl J. Schack et al., "Purification of Chlorine Trifluoride and Bromine Pentafluoride obtained from Cylinders", Chemistry and Industry, 1967, pp. 545-546 (2 pages total).

* cited by examiner

METHOD FOR PRODUCING BROMINE PENTAFLUORIDE

CROSS REFERENCE TO RELATED APPLICATIONS

This application is a National Stage of International Application No. PCT/JP2020/034334 filed Sep. 10, 2020, claiming priority based on Japanese Patent Application No. 2019-184782 filed Oct. 7, 2019.

TECHNICAL FIELD

The present invention relates to a method for producing bromine pentafluoride.

BACKGROUND ART

Bromine pentafluoride ($BrF_5$) is generally produced by reacting a bromine-containing compound which is at least one of a bromine gas ($Br_2$) and bromine trifluoride ($BrF_3$) with a fluorine gas ($F_2$).

For example, PTL 1 discloses a method of feeding a bromine gas or bromine trifluoride and a fluorine gas to a reactor filled with nickel fluoride ($NiF_2$) to give a (fluorine atom):(bromine atom) molar ratio, that is, F/Br of 5 or more and reacting them to obtain bromine pentafluoride.

CITATION LIST

Patent Literature

PTL 1: JP 2017-197390 A

SUMMARY OF INVENTION

Technical Problem

In the method for producing bromine pentafluoride as disclosed in PTL 1, bromine pentafluoride is produced efficiently by feeding a fluorine gas in an amount of a reaction equivalent or more to a reaction system and performing a reaction. Feeding an excess amount of a fluorine gas to a reaction system however may leave a large amount of an unreacted fluorine gas, so that the fluorine gas thus left should be treated by recovery or abatement.

An object of the present invention is to provide a method for producing bromine pentafluoride capable of producing bromine pentafluoride containing a small residual amount of an unreacted fluorine gas and having a high purity.

Solution to Problem

In order to achieve the above-described object, one aspect of the present invention is provided in the following [1] to [11].

[1] A method for producing bromine pentafluoride including:

a reaction step of feeding a bromine-containing compound, the bromine-containing compound being at least one of a bromine gas and bromine trifluoride, and a fluorine gas to a reactor to give a (fluorine atom):(bromine atom) molar ratio, that is, F/Br of 3.0 or more and 4.7 or less and reacting the bromine-containing compound and the fluorine gas to each other to obtain a reaction mixture containing bromine pentafluoride and bromine trifluoride; and a separation step of separating bromine pentafluoride and bromine trifluoride in the reaction mixture from each other.

[2] The method for producing bromine pentafluoride as described in [1], wherein in the reaction step, an inert gas is fed to the reactor along with the bromine-containing compound and the fluorine gas to perform the reaction and the inert gas is fed in an amount of 50 vol % or more relative to the total gas volume of the bromine-containing compound, the fluorine gas and the inert gas.

[3] The method for producing bromine pentafluoride as described in [1] or [2], wherein the reaction is performed at a pressure of 0.1 MPa or more and 0.5 MPa or less.

[4] The method for producing bromine pentafluoride as described in any one of [1] to [3], wherein the reaction is performed at a temperature of 100° C. or more and 400° C. or less.

[5] The method for producing bromine pentafluoride as described in any one of [1] to [4], wherein the reaction is performed by placing at least one of an oxide of a metal and a fluoride of a metal as a catalyst in the reactor and the metal is at least one of metals belonging to the Group III elements and the Group IV elements in the periodic table.

[6] The method for producing bromine pentafluoride as described in [5], wherein the catalyst is at least one selected from $Al_2O_3$, $NiF_2$, $FeF_3$, $CoF_2$, and $AlF_3$.

[7] The method for producing bromine pentafluoride as described in any one of [1] to [6], wherein the reactor is a bright annealing tube made of nickel.

[8] The method for producing bromine pentafluoride as described in any one of [1] to [7], wherein the separation step includes a cooling step of cooling and separating the reaction mixture into a gas component containing bromine pentafluoride and a liquid-solid component containing bromine trifluoride.

[9] The method for producing bromine pentafluoride as described in [8], wherein the separation step further includes an adsorption step of bringing the gas component containing bromine pentafluoride obtained by the cooling step into contact with an adsorbent and allowing bromine trifluoride mixed in the gas component containing bromine pentafluoride to be adsorbed by the adsorbent.

[10] The method for producing bromine pentafluoride as described above in [9], wherein the adsorbent is a fluoride of at least one of metals belonging to the Group I elements and the Group II elements in the periodic table.

[11] The method for producing bromine pentafluoride as described in [9], wherein the adsorbent is at least one selected from LiF, NaF, KF, RbF, CsF, $MgF_2$, and $CaF_2$.

Advantageous Effects of Invention

The method for producing bromine pentafluoride according to the present invention can produce bromine pentafluoride containing a small residual amount of an unreacted fluorine gas and having a high purity.

DESCRIPTION OF EMBODIMENTS

One embodiment of the present invention will next be described. This embodiment is only one example of the present invention and the present invention is not limited to this embodiment. Various modifications or improvements may be added to the present embodiment and even such an embodiment with the modification or improvement may be embraced in the present invention. For example, a material, size, or the like shown in the present embodiment is merely an example. The present invention is not limited to it but can be carried out after changing it as needed within the scope where the advantage of the present invention is brought about.

The method for producing bromine pentafluoride according to the present embodiment includes a reaction step and a separation step. The reaction step is a step of reacting a bromine-containing compound which is at least one of a bromine gas and bromine trifluoride and a fluorine gas to each other to obtain a reaction mixture containing bromine pentafluoride and bromine trifluoride. In this reaction step, a reaction between the bromine-containing compound and the fluorine gas is made in a reactor by feeding the bromine-containing compound and the fluorine gas to the reactor to give a (fluorine atom):(bromine atom) molar ratio, that is, F/Br of 3.0 or more and 4.7 or less. The separation step is a step of separating, from each other, bromine pentafluoride and bromine trifluoride in the reaction mixture obtained in the reaction step.

When bromine pentafluoride is produced by the method of the present embodiment, an amount of a fluorine gas used is less than a reaction equivalent, so that no unreacted fluorine gas remains or even if it remains, the amount is small. It is therefore possible to eliminate or simplify a process for treating the residual fluorine gas by a method such as recovery or abatement. In addition, since the amount of a fluorine gas used is small, the using amount of the fluorine gas can be suppressed and at the same time, an emission amount of the fluorine gas from the reactor can be suppressed.

Further, the method for producing bromine pentafluoride according to the present embodiment has the separation step of separating bromine pentafluoride and bromine trifluoride from each other, so that bromine pentafluoride with high purity (for example, purity of 90% or more) can be produced. In other words, in the separation step, components other than the fluorine gas and bromine pentafluoride can be removed efficiently from the reaction mixture, so that the method for producing bromine pentafluoride according to the present embodiment having a small residual amount of the fluorine gas in the reaction mixture is advantageous for obtaining high-purity bromine pentafluoride.

The bromine pentafluoride thus obtained can be used as an etching gas, a cleaning gas, a fluorinating agent, or the like in the organic synthesis field, inorganic synthesis field, nuclear energy field, semiconductor manufacture field, and the like.

The method for producing bromine pentafluoride according to the present embodiment will hereinafter be described more specifically.

[1] Reaction for Preparing Bromine Pentafluoride

In the method for producing bromine pentafluoride according to the present embodiment, when the bromine-containing compound is a bromine gas ($Br_2$), a fluorine gas and the bromine gas, which are raw material compounds, react with each other as shown in the following chemical reaction formula (1) to prepare bromine pentafluoride as an intended product.

$$5F_2 + Br_2 \rightarrow 2BrF_5 \quad (1)$$

Also, when the bromine-containing compound is a bromine gas ($Br_2$), the fluorine gas and the bromine gas, which are raw material compounds, may react with each other in two stages as shown in the following chemical reaction formulas (2) and (3) to prepare bromine pentafluoride as an intended product.

$$5F_2 + Br_2 \rightarrow 2BrF_3 + 2F_2 \quad (2)$$

$$F_2 + BrF_3 \rightarrow BrF_5 \quad (3)$$

Further, when the bromine-containing compound is bromine trifluoride, the fluorine gas and the bromine trifluoride gas, which are raw material compounds, react with each other as shown in the following chemical reaction formula (3) to prepare bromine pentafluoride as an intended product.

$$F_2 + BrF_3 \rightarrow BrF_5 \quad (3)$$

[2] Method of Feeding Raw Material Compounds to a Reactor

Although the method of feeding a fluorine gas to a reactor in the method for producing bromine pentafluoride according to the present embodiment is not particularly limited, examples include a method of connecting a gas feeding mechanism to a container compression-filled with a fluorine gas or a container compression-filled with a mixed gas of a fluorine gas and an inert gas and feeding the fluorine gas or the mixed gas to the reactor while controlling the flow rate by the gas feeding mechanism. The temperature of the fluorine gas or the mixed gas to be fed to the reactor is not particularly limited as long as it is a temperature allowing the operation of the gas feeding mechanism.

Although the gas feeding mechanism is not particularly limited as long as it has a mechanism capable of controlling the flow rate of the gas, a mass flow controller, a flow meter, or the like is preferably used from the standpoint of availability. The following is a mode using a mass flow controller as one example of the gas feeding mechanism.

Although the method of feeding a bromine-containing compound (for example, a bromine gas or bromine trifluoride) to the reactor in the method for producing bromine pentafluoride according to the present embodiment is not particularly limited, examples include a method of heating and vaporizing the bromine-containing compound in a vaporizer connected to a mass flow controller and feeding the gas of the bromine-containing compound to the reactor while controlling the flow rate by the mass flow controller.

Alternatively, a method of making use of an inert gas to vaporize the bromine-containing compound can be used. Described specifically, it is a method of connecting a mass flow controller to a container compression-filled with an inert gas, feeding the inert gas to a vaporizer containing the bromine-containing compound while controlling the flow rate by the mass flow controller to vaporize the bromine-containing compound in the vaporizer, and feeding, to the reactor, a mixed gas of the bromine-containing compound and the inert gas fed at the controlled flow rate. When the inert gas is fed to the vaporizer, the inert gas may be blown into a bromine-containing compound in liquid form or may be fed to a gas phase part in the vaporizer.

The temperature in the vaporizer during vaporizing the bromine-containing compound and feeding it to the reactor can be changed as needed by a feed rate of the bromine-containing compound to the reactor. When the bromine-containing compound is a bromine gas ($Br_2$), the temperature in the vaporizer is preferably 10° C. or more and 60° C. or less. When the bromine-containing compound is bromine trifluoride, the temperature in the vaporizer is preferably 30° C. or more and 130° C. or less. At the temperature in the vaporizer falling within the aforesaid range, the vapor pressure of the bromine-containing compound becomes sufficiently high, so that bromine pentafluoride can be obtained with excellent productivity and in addition, corrosion of the vaporizer, pipe, reactor, and the like due to the bromine-containing compound is less likely to occur.

[3] A (Fluorine Atom):(Bromine Atom) Molar Ratio, That is, F/Br

To increase the conversion of a fluorine gas to 40% or more by the method for producing bromine pentafluoride according to the present embodiment, it is necessary to feed the bromine-containing compound and the fluorine gas to a reactor to give a (fluorine atom):(bromine atom) molar ratio, that is, F/Br of 3.0 or more and 4.7 or less and make a reaction between the bromine-containing compound and the fluorine gas.

Adjustment of the (fluorine atom):(bromine atom) molar ratio, that is, F/Br to 3.0 or more and 4.7 or less decreases the amount of an unreacted bromine-containing compound. This improves the productivity of bromine pentafluoride while reducing the amount of an unreacted fluorine gas and in addition, this facilitates the separation of bromine pentafluoride from the bromine trifluoride and fluorine gas in the reaction mixture in the separation step. To achieve such an effect more effectively, the (fluorine atom):(bromine atom) molar ratio, that is, F/Br is preferably adjusted to 3.3 or more and 4.5 or less.

It is to be noted that by adjusting the (fluorine atom):(bromine atom) molar ratio, that is, F/Br to 3.0 or more and 4.7 or less and the residence time of the raw material compound gas in the reactor to 5 seconds or more, the conversion of the fluorine gas in the reaction can be increased to 40% or more. The residence time of the raw material compound gas in the reactor will be described later in detail.

[4] Diluent Gas for Diluting the Raw Material Compounds

In the reaction step in the method for producing bromine pentafluoride according to the present embodiment, the gas of the bromine-containing compound and the fluorine gas which are the raw material compounds and a diluent gas for diluting the raw material compounds may be fed together to the reactor and a reaction between them may be performed. In short, the reaction between the bromine-containing compound and the fluorine gas may be conducted while mixing the diluent gas with the bromine-containing compound gas and the fluorine gas to dilute the latter two.

As the diluent gas, usable is an inert gas not reactive with the bromine-containing compound and the fluorine gas which are raw material compounds, bromine pentafluoride which is an intended product, or bromine trifluoride which is an intermediate or a byproduct.

Although the kind of the inert gas is not particularly limited, examples include a nitrogen gas, argon, and helium. Of these inert gases, a nitrogen gas is preferable as a diluent gas from the standpoint of easy availability and a low cost.

In the reaction step in the method for producing bromine pentafluoride according to the present embodiment, the reaction is made while mixing the diluent gas with the bromine-containing compound gas and the fluorine gas and thereby diluting the latter two with the diluent gas. This suppresses local excessive heat generation and facilitates reaction control, making it possible to suppress the reaction from getting out of control or the reactor from being corroded.

When the bromine gas and the fluorine gas are used as the raw material compounds, the reactions as shown in the foresaid chemical reaction formulas (1), (2), and (3) proceed. The reaction between the bromine gas and the fluorine gas proceeds vigorously and it may lead to a local reaction or a runaway reaction. The use of the diluent gas is effective for preventing such an inconvenience.

When the bromine trifluoride gas and the fluorine gas are used as the raw material compounds, on the other hand, the reaction as shown in the aforesaid chemical reaction formula (3) proceeds. The reaction between the bromine trifluoride gas and the fluorine gas proceeds relatively mildly, so that mixing a large amount of the diluent gas with the raw material compounds is not required. The use of the diluent gas however can reduce the risk of a local reaction or runaway reaction, so that use of the diluent gas is preferred.

Although the amount of the diluent gas to be fed in the reactor along with the raw material compounds is not particularly limited, it is preferably 30 vol % or more, more preferably 50 vol % or more of the total volume of the bromine-containing compound gas, the fluorine gas, and the diluent gas in the reactor. The amount of 30 vol % or more can sufficiently reduce the risk of a local reaction or runaway reaction, so that it allows the safer production of bromine pentafluoride.

To enhance the separation efficiency of the intended product in the separation step, the amount of the diluent gas to be fed in the reactor along with the raw material compounds is preferably 99 vol % or less, more preferably 90 vol % or less of the total volume of the bromine-containing compound gas, the fluorine gas, and the diluent gas in the reactor.

[5] Temperature in the Reactor

In the method for producing bromine pentafluoride according to the present embodiment, the reaction between the bromine-containing compound and the fluorine gas is made preferably at a temperature of 100° C. or more and 400° C. or less. At the temperature of 100° C. or more and 400° C. or less, the reaction between the bromine-containing compound and the fluorine gas proceeds smoothly and the conversion of the fluorine gas can be increased to 40% or more. This can decrease a residual amount of the unreacted fluorine gas and therefore, greatly reduce or simplify a process for treating the residual unreacted fluorine gas by a method such as recovery or abatement.

In addition, corrosion of the interior of the reactor by the raw material compound (fluorine gas or bromine-containing compound) or intended compound (bromine pentafluoride) is unlikely to occur at the temperature of 100° C. or more and 400° C. or less, so that the use of an expensive material such as platinum as the material of the reactor is not required.

Further, a reverse reaction of the chemical reaction formula (3) does not proceed easily at the temperature of 100° C. or more and 400° C. or less, so that the decomposition of bromine pentafluoride which is an intended product is unlikely to occur during the reaction.

Although the method of reacting the bromine-containing compound with the fluorine gas at the temperature of 100° C. or more and 400° C. or less is not particularly limited, examples include a method of feeding the bromine-containing compound gas and the fluorine gas in the reactor while adjusting the temperature in the reactor at 100° C. or more and 400° C. or less.

Although the method of adjusting the temperature in the reactor at 100° C. or more and 400° C. or less is not particularly limited, examples include a method of adjusting the temperature in the reactor by heating the reactor with heating means such as electric heater or vapor or in some cases by cooling with a jacket provided with a refrigerant.

In order to perform the reaction between the bromine-containing compound and the fluorine gas while placing a catalyst in the reactor, it is recommended to heat the reactor having the catalyst therein to adjust the reactor and the catalyst to a desired temperature and then feed the bromine-containing compound gas and the fluorine gas to the reactor. As the temperature of the catalyst is higher, the conversion of the fluorine gas is improved.

[6] Pressure in the Reactor

In the method for producing bromine pentafluoride according to the present embodiment, the pressure in the reactor during the reaction can be set optionally, depending on a method of separating or recovering the bromine-containing compound or a method of recovering bromine pentafluoride which is an intended product.

The reaction between the bromine-containing compound and the fluorine gas performed under pressure conditions however tilts the equilibrium of the reaction in a bromine pentafluoride formation direction, so that the higher pressure in the reactor can improve the productivity of bromine pentafluoride. On the other hand, it is preferred not to set the pressure in the reactor during the reaction higher than necessary in order to reduce the leakage risk of the fluorine gas, bromine gas, bromine trifluoride gas, or bromine tetrafluoride gas having both toxicity and corrosiveness.

Considering these points, the reaction between the bromine-containing compound and the fluorine gas is preferably performed at a pressure of 0.05 MPa or more and 0.5 MPa or less, more preferably a pressure of 0.1 MPa or more and 0.5 MPa or less, still more preferably a pressure of 0.1 MPa or more and 0.2 MPa or less. It is to be noted that the term "pressure" as used herein means an absolute pressure unless otherwise specified.

[7] Residence Time of Raw Material Compound Gas in the Reactor

In the method for producing bromine pentafluoride according to the present embodiment, the residence time of the raw material compound gas fed to the reactor (which may hereinafter be referred to as "residence time") can be set as needed in consideration of the yield or productivity of bromine pentafluoride.

At a reaction temperature at which a reverse reaction for decomposing bromine pentafluoride into bromine trifluoride and a fluorine gas does not become marked, the conversion of the fluorine gas is improved with an increase in the residence time. However, the volume of the reactor should be increased with an increase in the residence time, so that it is preferred to decrease the residence time and decrease the volume of the reactor in consideration of the productivity of bromine pentafluoride.

Considering the aforesaid points, for the reaction of the bromine-containing compound and the fluorine gas at a temperature condition of 100° C. or more and 400° C. or less, the residence time is preferably 5 seconds or more. Then, the conversion of the fluorine gas can be increased to 40% or more.

[8] Catalyst

In the method for producing bromine pentafluoride according to the present embodiment, the reaction for obtaining bromine pentafluoride may be controlled by placing the catalyst in the reactor, allowing it to be present with the raw material compounds such as the bromine-containing compound and the fluorine gas during the reaction, and thereby performing the reaction between the bromine-containing compound and the fluorine gas.

The catalyst has preferably low reactivity with the bromine-containing compound, the fluorine gas, and bromine pentafluoride. At least one of the oxide of a metal and the fluoride of a metal is a compound used as the catalyst. The metal is at least one of metals belonging to the Group III elements and the Group IV elements in the periodic table.

More specifically, examples of the fluoride of a metal include aluminum fluoride ($AlF_3$), calcium fluoride ($CaF_2$), iron (III) fluoride ($FeF_3$), cobalt (II) fluoride ($CoF_2$), nickel (II) fluoride ($NiF_2$), copper (I) fluoride ($CuF$), potassium fluoride ($KF$), magnesium fluoride ($MgF_2$), and sodium fluoride ($NaF$); and examples of the oxide of a metal include aluminum oxide ($Al_2O_3$ such as $\alpha$-$Al_2O_3$), nickel (II) oxide ($NiO$), iron (III) oxide ($Fe_2O_3$), and cobalt (II) oxide ($CoO$). In consideration of the low reactivity with the bromine-containing compound, the fluorine gas, and bromine pentafluoride and easy availability, $AlF_3$, $FeF_3$, $CoF_2$, $NiF_2$, and $\alpha$-$Al_2O_3$ are more preferred.

The catalyst preferably contains no water. When a catalyst containing water is used, a fluorine gas, a bromine gas, bromine trifluoride, or bromine pentafluoride may react with water during the production of bromine pentafluoride to form hydrogen fluoride (HF) or hydrogen bromide (HBr) and may cause problems such as mixing of hydrogen fluoride or hydrogen bromide in an intended product, that is, bromine pentafluoride or acceleration of corrosion of a reactor or pipe. When the catalyst containing water is used, therefore, a pretreatment is preferably conducted by dehydrating the catalyst by means of heat drying, vacuum drying, or the like under circulation of an inert gas.

The form of the catalyst is not particularly limited as long as it enables efficient contact with the fluorine gas, bromine gas, or bromine trifluoride gas to be circulated in the reactor and does not block these gases in the reactor.

Specific examples include catalysts obtained by bringing a fluorine gas, a chlorine trifluoride gas ($ClF_3$), an iodine heptafluoride gas ($IF_7$), or a bromine pentafluoride gas into contact with a porous body or mesh made of a metal at a high temperature to fluorinate the surface of the metal and form a metal fluoride. In addition, those obtained by forming commercially available metal fluoride or metal oxide powders into pellets can be used or commercially available molded or formed products of a metal fluoride or metal oxide can be used as are.

The catalyst in the form of a porous body, mesh, or the like form is however preferred because such a catalyst has a large contact area, per unit volume, between the gas and the metal surface and allows a bromine pentafluoride production reaction to proceed efficiently. In particular, more preferred are a porous body having a pore size of 0.3 mm or more and 3.2 mm or less and a specific surface area of 500 $m^2/m^3$ or more and 10000 $m^2/m^3$ or less and a mesh having a wire diameter of 0.04 mm or more and 0.8 mm or less and an opening of 0.04 mm or more and 0.98 mm or less.

[9] Structure of the Reactor

The reactor to be used in the method for producing bromine pentafluoride according to the present embodiment has preferably a structure enabling contact of the bromine-containing compound gas and the fluorine gas which are the raw material compounds with the catalyst and a flow reactor or a batch reactor may be used. The reactor may be either tubular or tank type and the tubular reactor may be either single tubular or multi-tubular. The catalyst packing form may be either a fluidized bed or a fixed bed. The reactor is preferably either single tubular or multi-tubular, while the catalyst packing form is preferably a fixed bed.

When the flow reactor is used, the bromine-containing compound gas and the fluorine gas which are the raw material compounds should be fed simultaneously to the flow reactor. When the batch reactor is used, a premixture of the bromine-containing compound gas and the fluorine gas may be introduced into the batch reactor or the bromine-containing compound gas and the fluorine gas may be fed separately to the batch reactor. When the bromine-containing compound gas and the fluorine gas are fed separately to the batch reactor, these raw material compounds may be fed to the reactor in any order. The bromine-containing compound gas and the fluorine gas may be fed simultaneously to the reactor or may be fed sequentially to the reactor.

In the method for producing bromine pentafluoride according to the present embodiment, a tubular flow reactor is preferably used as the reactor in consideration of obtaining bromine pentafluoride continuously. The shape of the tubular flow reactor is not particularly limited as long as it allows flow of the bromine-containing compound gas or fluorine gas, but when a catalyst such as $NiF_2$ is placed in the reactor, the reactor preferably has a space for having the catalyst therein and allowing the gas to flow in the reactor while having the catalyst therein.

When the tubular reactor is used in the method for producing bromine pentafluoride according to the present embodiment, a rough inner surface of the tubular reactor may create resistance during the flow of the gas in the tubular reactor and thereby cause the residence of the gas, increase in pressure loss, abnormal heat generation due to a local reaction, and the like, making it difficult to control the reaction. The tubular reactor therefore has preferably a smooth inner surface. More specifically, a bright annealing tube with a smooth inner surface manufactured by a method including a step of heating and quenching in a non-oxidizing atmosphere such as inert gas or vacuum is preferably used as the tubular reactor.

[10] Material of the Reactor

The reactor to be used in the method for producing bromine pentafluoride according to the present embodiment needs to be made of a material corrosion-resistant to the fluorine gas or the bromine-containing compound gas. Specific examples include metals such as nickel, nickel-based alloy, aluminum, stainless steel, and platinum and ceramics such as alumina. Specific examples of the nickel-based alloy include Inconel (registered trademark), Hastelloy (registered trademark), and Monel (registered trademark).

When the temperature in the reactor is increased to 150° C. or more, it is preferred to select nickel, a nickel-based alloy, platinum, or alumina having particularly excellent corrosion resistance from the aforesaid materials, with easily available and relatively inexpensive nickel and nickel-based alloy being particularly preferred. The metal oxide or metal fluoride used as the catalyst may be used as the material of the reactor.

The reactor to be used in the method for producing bromine pentafluoride according to the present embodiment is preferably a bright annealing tube made of nickel. Since nickel has excellent corrosion resistance against a high-temperature fluorine gas, bromine gas, bromine trifluoride gas, or bromine pentafluoride gas to be used in the method for producing bromine pentafluoride according to the present embodiment and in addition, the bright annealing tube has a smooth surface, the risk of an abnormal reaction between the aforesaid gas and a metal residue or damage to the reactor can be reduced to the minimum.

By carrying out the method for producing bromine pentafluoride according to the present embodiment while using the reactor made of nickel, the inner surface of the reactor may be fluorinated with the fluorine gas, bromine trifluoride gas, or bromine pentafluoride gas and converted to $NiF_2$. In the method for producing bromine pentafluoride according to the present embodiment, however, no problem occurs even if the inner surface of the reactor is converted into $NiF_2$ as can be seen from the use of $NiF_2$ as the catalyst. Similarly, no problem occurs when the material of the reactor is the aforesaid metal and the metal reacts with the fluorine gas, bromine trifluoride gas, or bromine pentafluoride gas to fluorinate the inner surface of the reactor.

Examples of the material usable for the bright annealing tube include nickel, nickel-based alloys having a nickel content of 50 mass % or more and containing iron, copper, chromium, molybdenum, or the like (for example, Inconel (registered trademark), Hastelloy (registered trademark), and Monel (registered trademark)), and $NiF_2$.

[11] Cooling and Collecting Container

The method for producing bromine pentafluoride according to the present embodiment includes a separation step and in the separation step, bromine pentafluoride and bromine trifluoride in the reaction mixture obtained in the reaction step are separated from each other. The separation step may include a cooling step of cooling the reaction mixture to separate it into a gas component containing bromine pentafluoride and a liquid-solid component containing bromine trifluoride.

For cooling of the reaction mixture, for example, a cooling and collecting container can be used. By feeding the reaction mixture obtained in the reaction step to the cooling and collecting container and cooling it to a temperature at which bromine trifluoride is a solid or a liquid and bromine pentafluoride is neither a solid nor a liquid, bromine trifluoride and bromine pentafluoride can be separated from each other. For example, when the reaction mixture is cooled to 0° C., a large portion of bromine trifluoride is a solid and is collected in the cooling and collecting container (which may hereinafter be referred to as "cooling and collecting container for collecting bromine trifluoride"), while a large portion of bromine pentafluoride passes through the cooling and collecting container in the form of a gas.

A large portion of bromine trifluoride is a solid in the cooling and collecting container, but a portion of bromine trifluoride present in liquid or gaseous form sometimes passes through the cooling and collecting container, so that an operation for separating bromine trifluoride from the gas which has passed through the cooling and collecting container is preferably performed further. This operation will be described more specifically in the item [12]. When a diluent gas such as nitrogen gas is used in the reaction step, the reaction mixture is accompanied with the diluent gas, so that a large portion of bromine pentafluoride is likely to pass through the cooling and collecting container as a gas, though a portion of bromine pentafluoride is collected in liquid form in the cooling and collecting container.

The cooling temperature of the reaction mixture in the cooling and collecting container is preferably in a range of −20° C. or more to 30° C. or less, more preferably in a range of −10° C. or more to 20° C. or less. In this temperature range, a separation efficiency between bromine pentafluoride and bromine trifluoride is high because bromine trifluoride can be collected at high efficiency and the collection amount of bromine pentafluoride is small. Collection at a temperature not more than the melting temperature of bromine trifluoride may solidify bromine trifluoride in a pipe connected to the cooling and collecting container and block the pipe, but when a diluent gas is used in the reaction step and the reaction mixture is accompanied with the diluent gas, the pipe can be suppressed from being blocked with the solidified bromine trifluoride. Here, the pressure inside the cooling and collecting container is preferably 0.05 MPa or more and 0.5 MPa or less, more preferably 0.1 MPa or more and 0.3 MPa or less.

By feeding the bromine pentafluoride which has passed through the cooling and collecting container to another cooling and collecting container (which may hereinafter be referred to as "cooling and collecting container for collecting bromine pentafluoride") and cooling it to a temperature which solidifies or liquifies the bromine pentafluoride, the bromine pentafluoride can be collected in the another cooling and collecting container. The cooling temperature in the cooling and collecting container for collecting bromine pentafluoride is not particularly limited as long as it is a temperature less than the boiling temperature of bromine pentafluoride. In order to improve the collection efficiency of bromine pentafluoride, however, it is preferred to cool to a temperature at which the vapor pressure of bromine pentafluoride becomes sufficiently low. More specifically, the cooling temperature in the cooling and collecting container for collecting bromine pentafluoride is preferably in a range of −100° C. or more and 0° C. or less, more preferably in a range of −80° C. or more and −20° C. or less.

Collection at a temperature not more than the melting temperature of bromine pentafluoride may solidify bromine pentafluoride in a pipe connected to the cooling and collecting container for collecting bromine pentafluoride and block the pipe with it. When a diluent gas is used in the reaction step and the reaction mixture is accompanied with the diluent gas, however, blocking of the pipe with solidified bromine pentafluoride can be suppressed. Here, the pressure in the cooling and collecting container is preferably 0.05 MPa or more and 0.5 MPa or less, more preferably 0.1 MPa or more and 0.3 MPa or less.

The cooling and collecting container for collecting bromine trifluoride and the cooling and collecting container for collecting bromine pentafluoride need to be made of a material which is less reactive and corrosion-resistant to the fluorine gas, bromine gas, bromine trifluoride gas, or bromine pentafluoride gas. Specific examples include metals such as nickel, nickel-based alloy, aluminum, stainless steel, and platinum and ceramics such as alumina. Specific examples of the nickel-based alloy include Inconel (registered trademark), Hastelloy (registered trademark), and Monel (registered trademark). Of the surfaces of the cooling and collecting container made of the aforesaid metal, an inner surface to be brought into contact with the fluorine gas or the like may be fluorinated. Of these materials, easily available and relatively inexpensive Monel (registered trademark), aluminum, alumina, and stainless steel are particularly preferred.

[12] Adsorption Tower

As described above, the method for producing bromine pentafluoride according to the present embodiment has a separation step and in this separation step, bromine pentafluoride and bromine trifluoride in the reaction mixture obtained in the reaction step are separated from each other. The separation step may further include a cooling step of cooling the reaction mixture to separate it into a bromine pentafluoride-containing gas component and a bromine trifluoride-containing liquid-solid component and an adsorption step of bringing the bromine pentafluoride-containing gas component obtained in the cooling step into contact with an adsorbent to allow bromine trifluoride mixed in the bromine pentafluoride-containing gas component to be adsorbed by the adsorbent. For example, an adsorption tower may be used for the adsorption of bromine trifluoride.

Although the kind of the adsorbent packed in an adsorption tower is not particularly limited as long as it cannot easily adsorb bromine pentafluoride but can adsorb bromine trifluoride thereon, at least one of fluorides of metals belonging to the Group I elements and the Group II elements of the periodic table is usable. These fluorides of metals react with bromine trifluoride as shown in the following chemical reaction formula (4) to form corresponding salts, while they do not react with bromine pentafluoride and therefore do not form a salt, making it possible to perform selective separation of bromine trifluoride. In the chemical reaction formula (4), M represents a metal and x stands for 1 or 2.

$$BrF_3 + MF_x \rightarrow MBrF_{x+3} \tag{4}$$

Of these metal fluorides, at least one selected from lithium fluoride (LiF), sodium fluoride (NaF), potassium fluoride (KF), rubidium fluoride (RbF), cesium fluoride (CsF), magnesium fluoride ($MgF_2$), and calcium fluoride ($CaF_2$) is preferred, with at least one selected from LiF, NaF, KF, $MgF_2$, and $CaF_2$ being more preferred from the standpoint of easy availability.

An adsorption temperature of bromine trifluoride, that is, a temperature in an adsorption tower at the time when the bromine pentafluoride-containing gas component obtained in the cooling step is brought into contact with the adsorbent in the adsorption tower is preferably in a range of 0° C. or more and 100° C. or less, more preferably in a range of 20° C. or more and 70° C. or less. This temperature range is not likely to cause solidification of bromine trifluoride or liquification of bromine pentafluoride and is therefore not likely to block the adsorption tower or a pipe connected thereto and in addition, not likely to cause desorption of bromine trifluoride from the adsorbent, so that bromine trifluoride can be separated sufficiently. The pressure inside the adsorption tower is preferably 0.05 MPa or more and 0.5 MPa or less, more preferably 0.1 MPa or more and 0.3 MPa or less.

The adsorption tower needs to be made of a material which is less reactive and corrosion-resistant to the fluorine gas, bromine gas, bromine trifluoride gas, and bromine pentafluoride gas. Specific examples of the material include metals such as nickel, nickel-based alloy, aluminum, stainless steel, and platinum and ceramics such as alumina. Specific examples of the nickel-based alloy include Inconel (registered trademark), Hastelloy (registered trademark), and Monel (registered trademark). The adsorption tower made of the aforesaid metal may have, as an inner surface to be brought into contact with the fluorine gas or the like, a fluorinated surface.

[13] Example of a Bromine Pentafluoride Production Apparatus

Figure 1:
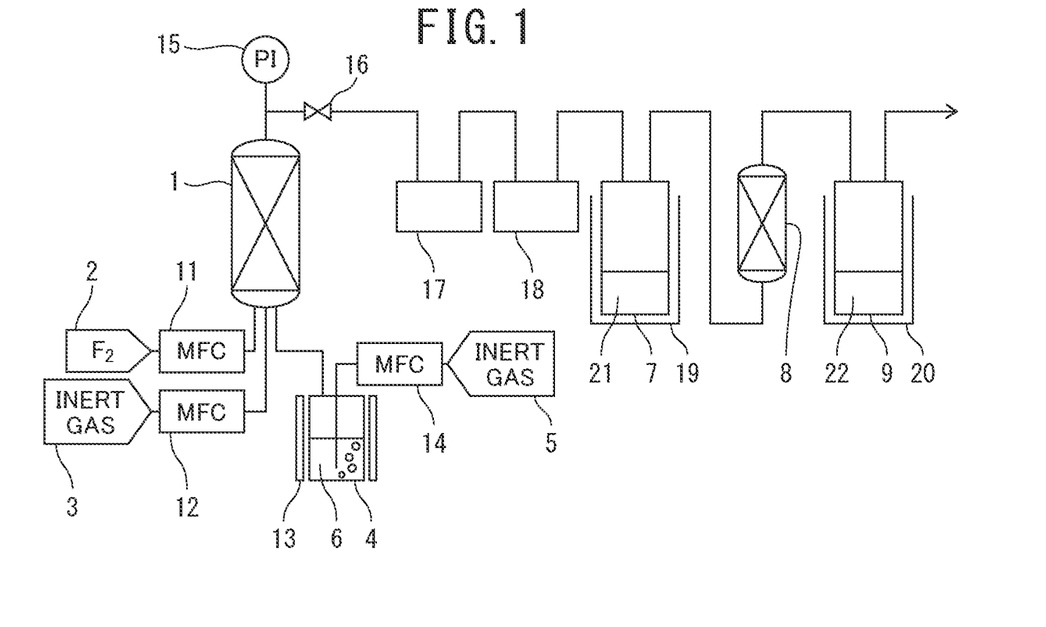
FIG. 1 is a schematic outline view of a bromine pentafluoride production apparatus for describing a method for producing bromine pentafluoride according to one embodiment of the present invention.

The method for producing bromine pentafluoride according to the present embodiment can be performed in a bromine pentafluoride production apparatus illustrated in FIG. 1. The bromine pentafluoride production apparatus illustrated in FIG. 1 has a reactor 1 for carrying out a reaction between a gas of a bromine-containing compound which is at least one of bromine and bromine trifluoride and a fluorine gas, a fluorine gas feeder 2 for feeding the fluorine gas to the reactor 1, amass flow controller 11 for controlling the flow rate of the fluorine gas fed from the fluorine gas feeder 2 to the reactor 1, an inert gas feeder 3 for feeding an inert gas to the reactor 1, a mass flow controller 12 for controlling the flow rate of the inert gas fed from the inert gas feeder 3 to the reactor 1, and a vaporizer 4 for storing a bromine-containing compound 6 which is at least one of bromine in liquid form and bromine trifluoride in liquid form, vaporizing the bromine-containing compound 6 in liquid form, and feeding the thus vaporized compound to the reactor 1.

In the reactor 1, a metal (not illustrated) serving as a catalyst is placed. The reactor 1 is equipped with a heating unit (not illustrated) such as electric furnace so that the temperature in the reactor 1 can be controlled to any temperature.

The vaporizer 4 is equipped with an inert gas feeder 5 for blowing an inert gas into the bromine-containing compound 6 in liquid form in the vaporizer 4, a mass flow controller 14 for controlling the flow rate of the inert gas fed from the inert gas feeder 5 to the vaporizer 4, and a heating unit 13 for heating the bromine-containing compound 6 in liquid form in the vaporizer 4.

The bromine pentafluoride production apparatus illustrated in FIG. 1 further has a pressure gauge 15 for measuring the pressure in the reactor 1, a first cooling and collecting container 7 (corresponding to the aforesaid "cooling and collecting container for collecting bromine trifluoride") for cooling a reaction mixture containing bromine pentafluoride and bromine trifluoride, collecting bromine trifluoride, and allowing bromine pentafluoride to pass through the container to separate bromine pentafluoride and bromine trifluoride from each other, an adsorption tower 8 filled with a metal fluoride as adsorbent, and a second cooling and collecting container 9 (corresponding to the aforesaid "cooling and collecting container for collecting bromine pentafluoride") for cooling and collecting bromine pentafluoride which has passed through the adsorption tower 8.

The first cooling and collecting container 7 is equipped with a cooling tank 19 and the temperature in the first cooling and collecting container 7 is controlled by this cooling tank 19. Similarly, the second cooling and collecting container 9 is equipped with a cooling tank 20 and the temperature in the second cooling and collecting container 9 is controlled by this cooling tank 20.

The reactor 1, the first cooling and collecting container 7, the adsorption tower 8, and the second cooling and collecting container 9 are arranged in series in order of mention and they are connected to each other with pipes, respectively.

A pipe connecting the reactor 1 and the first cooling and collecting container 7 is provided with a pressure regulating valve 16, a Fourier-transform infrared spectrophotometer 17, and an ultraviolet-visible spectrophotometer 18. The pressure regulating valve 16, the Fourier-transform infrared spectrophotometer 17, and the ultraviolet-visible spectrophotometer 18 are arranged in series in order of mention from the side of the reactor 1.

Next, one example of a method for producing bromine pentafluoride by using the bromine pentafluoride production apparatus illustrated in FIG. 1 will be described.

The bromine-containing compound 6 in liquid form in the vaporizer 4 is heated with the heating unit 13 to vaporize the bromine-containing compound 6. The vaporizer 4 therefore has therein the bromine-containing compound 6 in liquid form and the gas of the bromine-containing compound 6. An inert gas is blown from the inert gas feeder 5 into the bromine-containing compound 6 in liquid form in the vaporizer 4 while controlling the flow rate by the mass flow controller 14. By blowing the inert gas, the gas of the bromine-containing compound 6 is fed from the vaporizer 4 to the reactor 1 while being diluted with the inert gas.

On the other hand, a fluorine gas is fed from the fluorine gas feeder 2 to the reactor 1 while controlling the flow rate by the mass flow controller 11 and an inert gas is fed from the inert gas feeder 3 to the reactor 1 while controlling the flow rate by the mass flow controller 12. At this time, the concentration of the fluorine gas fed to the reactor 1 can be controlled by the mass flow controllers 11 and 12.

In other words, if not the inert gas but only the fluorine gas is fed, the fluorine gas having a concentration of 100% can be fed to the reactor 1. If both the fluorine gas and the inert gas are fed, the fluorine gas diluted to an arbitrary concentration with the inert gas can be fed to the reactor 1.

It is to be noted that a fluorine gas diluted with an inert gas to X vol % will hereinafter be called "X vol % fluorine gas". For example, a fluorine gas diluted to 20 vol % with an inert gas will be called "20 vol % fluorine gas"; a fluorine gas diluted to 50 vol % with an inert gas will be called "50 vol % fluorine gas"; and a fluorine gas not diluted with an inert gas will be called "100 vol % fluorine gas".

The reaction between the bromine-containing compound gas and the fluorine gas is performed by feeding the bromine-containing compound gas and the fluorine gas to the reactor 1. This reaction is performed by feeding the bromine-containing compound gas and the fluorine gas to give a (fluorine atom):(bromine atom) molar ratio, that is, F/Br of 3.0 or more and 4.7 or less. During the reaction, the pressure in the reactor 1 is measured with the pressure gauge 15. As a result of the reaction, a reaction mixture in gaseous form containing bromine pentafluoride and bromine trifluoride is obtained. When an inert gas is fed to the reactor 1 along with the bromine-containing compound gas and the fluorine gas, a reaction mixture in gaseous form containing bromine pentafluoride, bromine trifluoride, and the inert gas is obtained. The reaction mixture however may contain an unreacted fluorine gas or bromine gas, or a byproduct bromine monofluoride (BrF).

The reaction mixture thus obtained is fed to the Fourier-transform infrared spectrophotometer 17 and the ultraviolet-visible spectrophotometer 18 while regulating the pressure to about 0.1 to 0.2 MPa with the pressure regulating valve 16. After quantitative analysis of the components of the reaction mixture by Fourier-transform infrared spectrophotometry and ultraviolet-visible spectrophotometry, the reaction mixture is fed to the first cooling and collecting container 7. Since the temperature in the first cooling and collecting container 7 is controlled to a predetermined temperature by the cooling tank 19, the reaction mixture is separated into a gas component containing bromine pentafluoride and a liquid-solid component containing bromine trifluoride.

Described specifically, a large portion of bromine trifluoride in the reaction mixture is solidified in the first cooling and collecting container 7 and collected in the first cooling and collecting container 7. The solidified bromine trifluoride is indicated by reference numeral 21 in FIG. 1. If the reaction mixture contains an unreacted bromine gas, the unreacted bromine gas is also solidified and collected in the first cooling and collecting container 7. On the other hand, a portion of bromine pentafluoride in the reaction mixture is liquified and collected, but a large portion of it is in gas form, so that a mixed gas containing the bromine pentafluoride in gas form and at least one of the unreacted fluorine gas and the inert gas is emitted from the first cooling and collecting container 7 and fed to the adsorption tower 8.

The mixed gas which has passed through the first cooling and collecting container 7 contains a small amount of bromine trifluoride, but this bromine trifluoride forms a complex salt with a metal fluoride packed in the adsorption tower 8, so that bromine trifluoride is selectively adsorbed and separated from the mixed gas in the adsorption tower 8. The mixed gas which has passed through the adsorption tower 8 therefore contains almost no bromine trifluoride.

The bromine pentafluoride-containing mixed gas which has passed through the adsorption tower 8 is fed to the second cooling and collecting container 9. Since the temperature of the second cooling and collecting container 9 is controlled to a predetermined temperature by the cooling tank 20, bromine pentafluoride in the mixed gas is solidified or liquified and is then collected. The solidified or liquified bromine pentafluoride is indicated by reference numeral 22 in FIG. 1. Bromine pentafluoride thus obtained has, for example, a purity as high as 90% or more.

At least one of the unreacted fluorine gas and the inert gas in the mixed gas is not collected even in the second cooling and collecting container 9 and is emitted from the bromine pentafluoride production apparatus.

Figure 2:
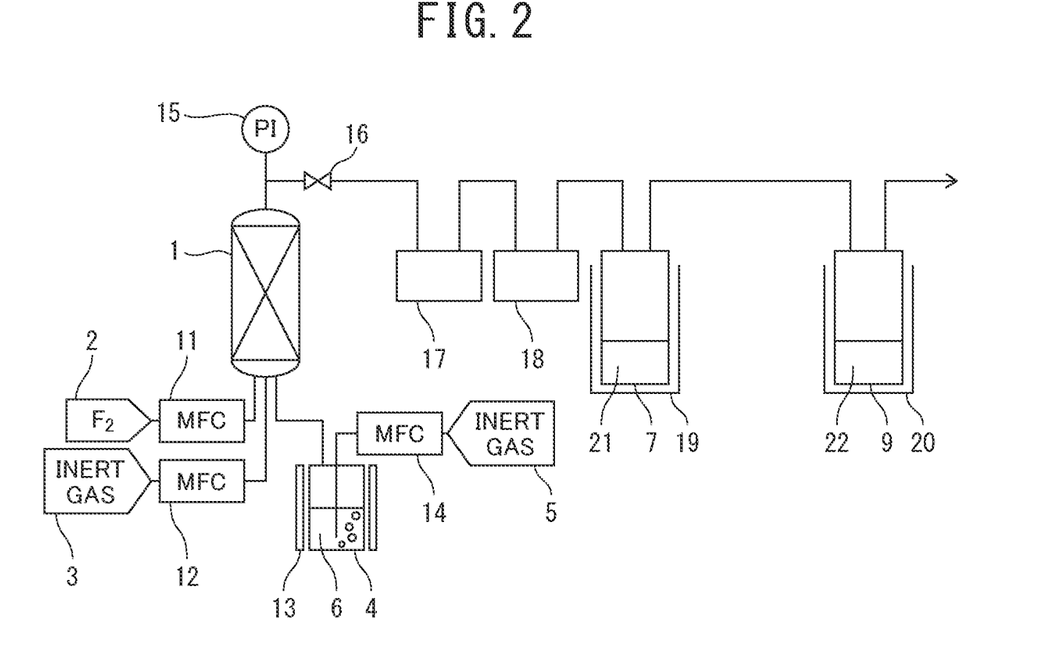
FIG. 2 is a schematic outline view illustrating a modification example of the bromine pentafluoride production apparatus of FIG. 1.

A bromine pentafluoride production apparatus of FIG. 2, a modification example of the bromine pentafluoride production apparatus of FIG. 1, is not equipped with the adsorption tower 8 and the first cooling and collecting container 7 and the second cooling and collecting container 9 are directly connected with each other via a pipe. Even by using the bromine pentafluoride production apparatus of FIG. 2 having such a structure, bromine pentafluoride can be produced as in the bromine pentafluoride production apparatus of FIG. 1.

EXAMPLES

The present invention will hereinafter be described more specifically by Examples and Comparative Examples.

Catalyst Preparation Example 1

A porous body made of nickel and having a purity of 99% (product of Nilaco Corporation, pore size: 0.5 mm, specific surface area: 7500 $m^2/m^3$, mass: 30 g (0.51 mol)) was placed in a bright annealing tube (inner diameter: 25.4 mm, length: 300 mm) made of nickel and having an electric heater and a pressure gauge. The bright annealing tube was heated with the electric heater to adjust the temperature of the nickel porous body to 300° C.

It is to be noted that the nickel bright annealing tube is a bright annealing tube made of Ni201 (nickel purity: 99.7 mass % or more) to be standardized by JIS H4552:2000 "nickel and nickel alloy seamless pipes and tubes".

Next, a 50 vol % fluorine gas was introduced at a flow rate of 200 sccm from one end (which will hereinafter be called "inlet") of the bright annealing tube and emitted from the other end (which will hereinafter be called "outlet"). This caused a reaction between the nickel constituting the nickel porous body and the fluorine gas to form a porous body made of $NiF_2$. The pressure in the bright annealing tube was set at 0.1 MPa. The term "sccm" as used herein means a volume flow rate ($cm^3$) per minute standardized under the conditions of 0° C. and 1 atmospheric pressure.

Completion of the reaction between nickel and the fluorine gas to form $NiF_2$ was confirmed by the following method. An exhaust gas emitted from the outlet of the bright annealing tube was caused to flow in an aqueous potassium iodide (KI) solution having a concentration of 10 mass % for 5 minutes and oxidation-reduction titration of the resulting aqueous potassium iodide solution having the exhaust gas caused to flow therein was performed using a 0.1N aqueous sodium thiosulfate solution. By the oxidation-reduction titration, the concentration of the fluorine gas emitted from the outlet of the bright annealing tube was determined. When the concentration of the fluorine gas emitted from the outlet of the bright annealing tube became equal to the concentration of the fluorine gas fed from the inlet of the bright annealing tube, the reaction between nickel and the fluorine gas was considered to be completed.

The oxidation-reduction titration was conducted when the 50 vol % fluorine gas was caused to flow for 3 hours in the bright annealing tube and completion of the reaction was confirmed by it. Then, ion chromatography and inductively coupled plasma optical emission spectroscopy were performed using the following apparatuses and conditions to confirm the formation of $NiF_2$.

Ion Chromatography

After about 50 mg of a sample was weighed in a 50-mL container, 40 mL of pure water was added and the resulting mixture was stirred. Then, pure water was added further to make a volume of 50 mL and thus, a sample solution was prepared. The resulting sample solution was diluted 100 times with pure water and the diluted sample solution was subjected to ion chromatography under the following conditions.

Measuring apparatus: DIONEX ICS-2000, product of Nippon Dionex

Eluent: aqueous potassium hydroxide solution (gradient elution at concentrations from 4 to 40 mM)

Flow rate: 1.0 mL/min
Column: DIONEX AG18/AS18, product of Nippon Dionex
Inner diameter of the column: 4 mm
Temperature of the column: 30° C.
Sample injection amount: 25 μL
Detector: conductivity detector Inductively Coupled Plasma Optical Emission Spectroscopy A sample solution the same as that used in the ion chromatography was diluted 100 times with dilute nitric acid and the resulting diluted sample solution was subjected to inductively coupled plasma optical emission spectroscopy with an inductively coupled plasma optical emission spectrometer Vista-PRO, product of Hitachi High-Tech Science.

A bright annealing tube which uses the porous body made of $NiF_2$ thus obtained (mass: 48 g (0.5 mol)) as a catalyst and in which the porous body made of $NiF_2$ is placed is used as a reactor for producing bromine pentafluoride.

Catalyst Preparation Example 2

In a manner similar to that of Catalyst Preparation Example 1 except that the porous body made of nickel was replaced by a porous body made of iron having a purity of 99% (product of Taisei Kogyo, pore size: 0.8 mm, specific surface area: 5700 $m^2/m^3$, mass: 27.9 g (0.5 mol)), the preparation and analysis of a catalyst (porous body made of $FeF_3$) were performed.

Catalyst Preparation Example 3

In a manner similar to that of Catalyst Preparation Example 1 except that the porous body made of nickel was replaced by a porous body made of cobalt having a purity of 99% (product of Nilaco, pore size: 2.0 mm, specific surface area: 6200 $m^2/m^3$, mass: 29.5 g (0.5 mol)), the preparation and analysis of a catalyst (porous body made of $CoF_2$) were performed.

Catalyst Preparation Example 4

In a manner similar to that of Catalyst Preparation Example 1 except that the porous body made of nickel was replaced by a porous body made of aluminum having a purity of 99% (product of Taisei Kogyo, pore size: 0.5 mm, specific surface area: 7000 $m^2/m^3$, mass: 27.9 g (0.5 mol)), the preparation and analysis of a catalyst (porous body made of $AlF_3$) were performed.

Example 1

By using an apparatus almost similar to the bromine pentafluoride production apparatus illustrated in FIG. 1, bromine pentafluoride was produced. A bright annealing tube (reactor) having therein 48 g of the catalyst (porous body made of $NiF_2$) prepared in Catalyst Preparation Example 1 was heated in an electric furnace to increase the temperature in the bright annealing tube (that is, the reaction temperature) to 280° C. By the heating, the temperature of the catalyst also becomes 280° C.

Next, after a vaporizer for having therein bromine trifluoride in liquid form as a bromine-containing compound was heated to 90° C., a nitrogen gas was blown into the bromine trifluoride in liquid form to obtain a bromine trifluoride gas. The resulting gas was fed in the bright annealing tube. The flow rate of the nitrogen gas blown into the bromine trifluoride in liquid form was adjusted to 300 sccm at 0° C. and 101 kPa, while the flow rate of the bromine trifluoride gas fed in the bright annealing tube was adjusted to 102 sccm.

Simultaneously with the feeding of the bromine trifluoride gas in the bright annealing tube, a 100 vol % fluorine gas was fed in the bright annealing tube at a flow rate of 76 sccm and a nitrogen gas serving as a diluent gas was fed in the bright annealing tube at a flow rate of 732 sccm. In other words, a raw material compound gas having a (bromine trifluoride):(fluorine gas):(nitrogen gas) composition ratio (volume ratio) of 11.2:8.4:80.4 supposing that the total volume was 100 was fed in the bright annealing tube. A (fluorine atom):(bromine atom) molar ratio F/Br of the raw material compound gas is therefore 4.5. At this time, the pressure in the bright annealing tube was set at 0.1 MPa. The residence time of the raw material compound gas in the bright annealing tube is 5 seconds.

Under the aforesaid conditions, a reaction for obtaining bromine pentafluoride from the fluorine gas and bromine trifluoride was continuously performed by causing the raw material compound gas to flow in the bright annealing tube for one hour. The reaction mixture in gaseous form emitted from the bright annealing tube was subjected to Fourier-transform infrared spectrophotometry and ultraviolet-visible spectrophotometry to determine the composition of the reaction mixture (concentrations of the fluorine gas, bromine trifluoride, bromine pentafluoride, and the like). The composition of the reaction mixture and the conversion of the fluorine gas were calculated supposing that no change occurred in the amount of the nitrogen gas.

A Fourier-transform infrared spectrophotometer Nicolet iS5, product of Thermo Fisher Scientific, was used for the Fourier-transform infrared spectrophotometry and the respective concentrations of bromine trifluoride and bromine pentafluoride were determined by the analysis. A double beam spectrophotometer U-2900, an ultraviolet-visible spectrophotometer manufactured by Hitachi High-Tech Science, was used for the ultraviolet-visible spectrophotometry and the respective concentrations of the bromine gas and the fluorine gas were determined by the analysis.

The reaction conditions, the composition of the raw material compound gas, the composition of the reaction mixture, and the conversion of the fluorine gas are shown in Table 1. The (fluorine atom):(bromine atom) molar ratio F/Br of the raw material compound can be calculated by assigning the respective concentrations (vol %) of the fluorine gas, the bromine gas, and the bromine trifluoride gas in the raw material compound to the following equation.

F/Br=[3×(concentration (vol %) of bromine trifluoride gas)+2×(concentration (vol %) of fluorine gas)]/[(concentration (vol %) of bromine trifluoride gas)+2×(concentration (vol %) of bromine gas)]

The conversion (yield) of the fluorine gas can be calculated by assigning the concentration (vol %) of the fluorine gas in the raw material compound gas and the concentration (vol %) of the fluorine gas in the reaction mixture to the following equation.

Conversion (%)=[(concentration (vol %) of fluorine gas in raw material compound gas)−(concentration (vol %) of fluorine gas in reaction mixture)]/(concentration (vol %) of fluorine gas in raw material compound gas)

TABLE 1

| | Catalyst | Reaction temperature (° C.) | Reaction pressure (MPa) | Composition of raw material compound gas (vol %) | | | | F/Br | Composition of reaction mixture (vol %) | | | | | Conversion of $F_2$ (%) |
|---|---|---|---|---|---|---|---|---|---|---|---|---|---|---|
| | | | | $Br_2$ | $BrF_3$ | $F_2$ | $N_2$ | | $Br_2$ | $BrF_3$ | $F_2$ | $BrF_5$ | $N_2$ | |
| Ex. 1 | $NiF_2$ | 280 | 0.1 | — | 11.2 | 8.4 | 80.4 | 4.5 | — | 3.1 | under 0.1 | 9.2 | 87.8 | over 99 |
| Ex. 2 | $NiF_2$ | 280 | 0.1 | 2.0 | — | 9.0 | 89.0 | 4.5 | under 0.1 | 2.7 | under 0.1 | 8.3 | 89.0 | over 99 |
| Ex. 3 | $NiF_2$ | 150 | 0.1 | — | 11.2 | 8.4 | 80.4 | 4.5 | — | 8.3 | 3.3 | 5.4 | 83.1 | 62 |
| Ex. 4 | $NiF_2$ | 150 | 0.2 | — | 11.2 | 8.4 | 80.4 | 4.5 | — | 9.2 | 2.2 | 6.4 | 82.2 | 74 |
| Ex. 5 | $NiF_2$ | 120 | 0.1 | 2.0 | — | 9.0 | 89.0 | 4.5 | under 0.1 | 3.0 | 1.9 | 1.3 | 93.9 | 80 |
| Ex. 6 | $NiF_2$ | 280 | 0.1 | — | 16.8 | 8.4 | 74.8 | 4.0 | — | 9.2 | under 0.1 | 9.2 | 81.7 | over 99 |
| Ex. 7 | $FeF_3$ | 280 | 0.1 | — | 11.2 | 8.4 | 80.4 | 4.5 | — | 6.4 | 3.5 | 5.4 | 84.7 | 61 |
| Ex. 8 | $CoF_2$ | 280 | 0.1 | — | 11.2 | 8.4 | 80.4 | 4.5 | — | 4.2 | 1.2 | 7.9 | 86.7 | 87 |
| Ex. 9 | $AlF_3$ | 280 | 0.1 | — | 11.2 | 8.4 | 80.4 | 4.5 | — | 5.2 | 2.2 | 6.7 | 85.8 | 75 |
| Ex. 10 | $Al_2O_3$ | 280 | 0.1 | — | 11.2 | 8.4 | 80.4 | 4.5 | — | 5.7 | 2.8 | 6.2 | 85.3 | 69 |
| Ex. 11 | $NiF_2$ | 280 | 0.1 | 2.0 | 5.6 | 13.2 | 79.2 | 4.5 | under 0.1 | 2.7 | under 0.1 | 8.1 | 89.2 | over 99 |
| Ex. 12 | $NiF_2$ | 280 | 0.1 | — | 25.6 | 19.2 | 55.2 | 4.5 | — | 7.9 | under 0.1 | 23.8 | 68.3 | over 99 |
| Ex. 13 | $NiF_2$ pellet | 280 | 0.1 | — | 11.2 | 8.4 | 80.4 | 4.5 | — | 7.8 | 4.9 | 3.8 | 83.5 | 44 |
| Ex. 14 | $NiF_2$ | 280 | 0.1 | — | 11.2 | 8.4 | 80.4 | 4.5 | — | 3.1 | under 0.1 | 9.2 | 87.8 | over 99 |
| Ex. 15 | $NiF_2$ | 280 | 0.1 | — | 11.2 | 1.8 | 87.0 | 3.3 | — | 9.6 | 0.0 | 1.8 | 88.6 | over 99 |
| Ex. 16 | $NiF_2$ | 150 | 0.5 | — | 11.2 | 8.4 | 80.4 | 4.5 | — | 3.7 | 0.8 | 7.6 | 87.8 | 90 |
| Ex. 17 | $NiF_2$ | 400 | 0.1 | — | 11.2 | 8.4 | 80.4 | 3.3 | — | 3.4 | 0.6 | 7.9 | 88.1 | 93 |
| Comp. Ex. 1 | $NiF_2$ pellet | 270 | 0.1 | — | 9.0 | 45.5 | 45.5 | 13.0 | — | 0.4 | 80.1 | 19.5 | — | 4 |

Next, the reaction mixture in gaseous form emitted from the bright annealing tube was fed to and cooled in a first cooling and collecting container (volume: 500 mL), which was made of stainless and cooled to 0° C., at a pressure of 0.1 MPa to collect bromine trifluoride. The composition of the material thus collected in the first cooling and collecting container was analyzed by Fourier-transform infrared spectrophotometry and ultraviolet-visible spectrophotometry. The results are shown in Table 2.

Next, the reaction mixture in gaseous form which passed through the first cooling and collecting container was caused to flow in a stainless tube (inner diameter: 12.7 mm, length: 100 mm) filled with sodium fluoride (purity: 99%, mass: 30 g (0.7 mol)) as an adsorbent and bromine trifluoride in the reaction mixture was allowed to be adsorbed by the adsorbent at a temperature of 35° C. The reaction mixture in gaseous form which passed through the stainless tube was fed to and cooled in a second cooling and collecting container (volume: 500 mL) made of stainless and cooled to −80° C. to collect bromine pentafluoride. The composition of the material collected in the second cooling and collecting container was analyzed by Fourier-transform infrared spectrophotometry and ultraviolet-visible spectrophotometry. The results are shown in Table 2.

TABLE 2

| | Material collected in first cooling and collecting container (vol %) | | | | Material collected in second cooling and collecting container (vol %) | | | |
|---|---|---|---|---|---|---|---|---|
| | $Br_2$ | $BrF_3$ | $F_2$ | $BrF_5$ | $Br_2$ | $BrF_3$ | $F_2$ | $BrF_5$ |
| Ex. 1 | — | 71.0 | under 0.1 | 29.0 | — | under 0.1 | under 0.1 | over 99 |
| Ex. 2 | under 0.1 | 65.0 | under 0.1 | 35.0 | under 0.1 | under 0.1 | under 0.1 | over 99 |
| Ex. 3 | — | 88.7 | 0.3 | 11.0 | — | under 0.1 | 1.0 | 99.0 |
| Ex. 4 | — | 77.5 | 0.5 | 22.0 | — | under 0.1 | 1.0 | 99.0 |
| Ex. 5 | under 0.1 | 90.0 | 0.6 | 9.4 | under 0.1 | under 0.1 | 1.2 | 98.8 |
| Ex. 6 | — | 92.0 | under 0.1 | 8.0 | — | under 0.1 | under 0.1 | over 99 |
| Ex. 7 | — | 87.5 | 0.5 | 12.0 | — | under 0.1 | 1.5 | 98.5 |
| Ex. 8 | — | 76.8 | 0.2 | 23.0 | — | under 0.1 | 1.3 | 98.7 |
| Ex. 9 | — | 71.6 | 0.4 | 28.0 | — | under 0.1 | 1.2 | 98.8 |
| Ex. 10 | — | 75.2 | 0.8 | 24.0 | — | under 0.1 | 1.0 | 99.0 |
| Ex. 11 | under 0.1 | 73.0 | under 0.1 | 27.0 | under 0.1 | under 0.1 | under 0.1 | over 99 |
| Ex. 12 | — | 72.0 | under 0.1 | 28.0 | — | under 0.1 | under 0.1 | over 99 |
| Ex. 13 | — | 83.3 | 0.7 | 16.0 | — | under 0.1 | 1.0 | 99.0 |
| Ex. 14 | — | 71.0 | under 0.1 | 29.0 | — | 4.0 | under 0.1 | 96.0 |
| Ex. 15 | — | 90.0 | under 0.1 | 10.0 | — | under 0.1 | under 0.1 | over 99 |
| Ex. 16 | — | 78.2 | 0.3 | 22.5 | — | under 0.1 | 1.4 | 98.6 |
| Ex. 17 | — | 77.6 | 0.3 | 22.1 | — | under 0.1 | 1.5 | 98.5 |

Example 2

In a manner similar to that of Example 1 except that a bromine gas was used as the bromine-containing compound and the composition ratio (volume ratio) of the raw material compound gas to be fed to the bright annealing tube was changed to (bromine gas):(fluorine gas):(nitrogen gas)=2.0: 9.0:89.0, the reaction and analysis were performed. The results are shown in Tables 1 and 2.

Example 3

In a manner similar to that of Example 1 except that the reaction temperature (catalyst temperature) was changed to

21

150° C., the reaction and analysis were performed. The results are shown in Tables 1 and 2.

Example 4

In a manner similar to that of Example 1 except that the reaction temperature was changed to 150° C. and the reaction pressure (pressure in the bright annealing tube) was changed to 0.2 MPa, the reaction and analysis were performed. The results are shown in Tables 1 and 2.

Example 5

In a manner similar to that of Example 2 except that the reaction temperature was changed to 120° C., the reaction and analysis were performed. The results are shown in Tables 1 and 2.

Example 6

In a manner similar to that of Example 1 except that the composition ratio (volume ratio) of the raw material compound gas to be fed to the bright annealing tube was changed to (bromine trifluoride gas):(fluorine gas):(nitrogen gas) =16.8:8.4:74.8 and the F/Br was 4.0, the reaction and analysis were performed. The results are shown in Tables 1 and 2.

Example 7

In a manner similar to that of Example 1 except that the catalyst was replaced by the catalyst (the porous body made of $FeF_3$) prepared in Catalyst Preparation Example 2, the reaction and analysis were performed. The results are shown in Tables 1 and 2.

Example 8

In a manner similar to that of Example 1 except that the catalyst was replaced by the catalyst (the porous body made of $CoF_2$) prepared in Catalyst Preparation Example 3, the reaction and analysis were performed. The results are shown in Tables 1 and 2.

Example 9

In a manner similar to that of Example 1 except that the catalyst was replaced by the catalyst (the porous body made of $AlF_3$) prepared in Catalyst Preparation Example 4, the reaction and analysis were performed. The results are shown in Tables 1 and 2.

Example 10

In a manner similar to that of Example 1 except that the catalyst was replaced by $\alpha\text{-}Al_2O_3$, the reaction and analysis were performed. The results are shown in Tables 1 and 2.

Example 11

In a manner similar to that of Example 1 except that bromine trifluoride and a bromine gas were used as the bromine-containing compound and the composition ratio (volume ratio) of the raw material compound gas to be fed to the bright annealing tube was changed to (bromine gas):(bromine trifluoride gas):(fluorine gas):(nitrogen gas) =2.0:5.6:13.2:79.2, the reaction and analysis were performed. The results are shown in Tables 1 and 2.

Example 12

In a manner similar to that of Example 1 except that the composition ratio (volume ratio) of the raw material compound gas to be fed to the bright annealing tube was changed to (bromine trifluoride gas):(fluorine gas):(nitrogen gas) =25.6:19.2:55.2, the reaction and analysis were performed. The results are shown in Tables 1 and 2.

Example 13

In a manner similar to that of Example 1 except that as the catalyst, used was a pellet (mass: 48 g (0.5 mol)) with a diameter of 3 mm and a length of 5 mm obtained by pressure forming of $NiF_2$ powder (product of Aldrich, purity: 99%), the reaction and analysis were performed. The results are shown in Tables 1 and 2.

Example 14

In a manner similar to that of Example 1 except that the reaction mixture in gaseous form which passed through the first cooling and collecting container was fed to the second cooling and collecting container without causing it to flow in a stainless tube filled with sodium fluoride, the reaction and analysis were performed. The results are shown in Tables 1 and 2.

Example 15

In a manner similar to that of Example 1 except that the composition ratio (volume ratio) of the raw material compound gas to be fed to the bright annealing tube was changed to (bromine trifluoride gas):(fluorine gas):(nitrogen gas) =11.2:1.8:87.0 and the F/Br was changed to 3.3, the reaction and analysis were performed. The results are shown in Tables 1 and 2.

Example 16

In a manner similar to that of Example 1 except that the reaction temperature was changed to 150° C. and the reaction pressure (pressure in the bright annealing tube) was changed to 0.5 MPa, the reaction and analysis were performed. The results are shown in Tables 1 and 2.

Example 17

In a manner similar to that of Example 1 except that the reaction temperature was changed to 400° C., the reaction and analysis were performed. The results are shown in Tables 1 and 2.

Comparative Example 1

In a manner similar to that of Example 1 except for the following points, the reaction and analysis were performed. As the catalyst, used was a pellet (mass: 85 g (0.88 mol)) obtained by pressure forming of $NiF_2$ powder. The reaction temperature was 270° C. The composition ratio (volume ratio) of the raw material compound gas to be fed to the bright annealing tube was (bromine trifluoride gas):(fluorine gas):(nitrogen gas)=9.0:45.5:45.5. The flow rate of the raw material compound gas to be fed to the bright annealing tube was set at 1151 cm³/min at 0° C. and 101 kPa so that the residence time of the raw material compound gas in the bright annealing tube was 10 seconds. The collection in the first cooling and collecting container and the second cooling and collecting container and the adsorption on an adsorbent were omitted. The results are shown in Table 1.

As is apparent from Table 1, the reaction mixture emitted from the bright annealing tube in Comparative Example 1 contained 0.4 vol % of bromine trifluoride, 80.1 vol % of the fluorine gas, and 19.5 vol % of bromine pentafluoride and thus, the reaction mixture contained a large amount of an unreacted fluorine gas. Extensive equipment is therefore required to treat the remaining fluorine gas by recovery or abatement.

On the other hand, the results of Examples 1 and 2 have suggested that when the porous body made of $NiF_2$ is used as the catalyst and the F/Br is adjusted to 4.5, the fluorine gas is quantitatively consumed and bromine pentafluoride can be obtained at a purity of 99% or more by using either the bromine gas or bromine trifluoride as the bromine-containing compound.

The results of Examples 3 to 5 and Example 16 have suggested that when the reaction temperature is set at 120° C. or 150° C., the conversion of the fluorine gas is improved by elevating the reaction pressure to 0.2 MPa or 0.5 MPa, though a slight amount of the fluorine gas remains. In Examples 3 to 5, about 1% of the fluorine gas was detected from the first cooling and collecting container and the second cooling and collecting container.

The results of Example 6 and Example 15 have suggested that even if the F/Br is set at 4.0 or 3.3, the reaction proceeds without problems and bromine pentafluoride can be obtained at a purity of 99% or more.

The results of Examples 7 to 10 have suggested that when the porous body made of $FeF_3$, porous body made of $CoF_2$, porous body made of $AlF_3$, or $\alpha\text{-}Al_2O_3$ is used as the catalyst, bromine pentafluoride can be obtained at a high purity, though showing a slight decrease in the conversion of the fluorine gas.

The results of Example 11 have suggested that the conversion of the fluorine gas proceeds smoothly and bromine pentafluoride can be obtained at a purity of 99% or more even under conditions where the bromine gas and the bromine trifluoride gas are caused to flow simultaneously.

The results of Example 12 have suggested that the conversion of the fluorine gas proceeds quantitatively and bromine pentafluoride can be obtained at a purity of 99% or more even if the concentration of the diluent nitrogen gas is decreased to 55.2%.

The results of Example 13 have suggested that when the $NiF_2$ pellet is used as the catalyst, bromine pentafluoride can be obtained at a high purity, though showing a decrease in the conversion of the fluorine gas.

The results of Example 14 have suggested that a slight amount of bromine trifluoride is collected in the second cooling and collecting container when the reaction mixture in gaseous form which passed through the first cooling and collecting container is not adsorbed on an adsorbent.

From the results of Example 17, it is presumed that remaining of a slight amount of the fluorine gas at the reaction temperature adjusted to 400° C. occurs because of the progress of the decomposition reaction of bromine pentafluoride under high-temperature conditions.

Example 20

The material (200 g, the mixture of bromine trifluoride and bromine pentafluoride) collected in the first cooling and collecting container in Example 1 was recovered. In a manner similar to that of Example 1 except that the collected material thus recovered was used as the raw material compound, in other words, the collected material thus recovered was used as the bromine-containing compound in the vaporizer, bromine trifluoride, a fluorine gas, bromine pentafluoride, and a nitrogen gas were fed to a bright annealing tube (reactor) equipped with a catalyst and a reaction to obtain bromine pentafluoride from the fluorine gas and bromine trifluoride was performed continuously under the reaction conditions (composition of the raw material compound gas and F/Br) shown in Table 3.

TABLE 3

| | Composition of raw material compound gas (vol %) | | | | | Composition of reaction mixture (vol %) | | | | Conversion of $F_2$ |
|---|---|---|---|---|---|---|---|---|---|---|
| | $BrF_3$ | $F_2$ | $BrF_5$ | $N_2$ | F/Br | $BrF_3$ | $F_2$ | $BrF_5$ | $N_2$ | (%) |
| Ex. 20 | 8.4 | 6.3 | 4.6 | 80.7 | 4.5 | 6.0 | under 0.1 | 18.2 | 80.7 | over 99 |

The composition of the reaction mixture obtained by the reaction and the respective compositions of the materials collected in the first cooling and collecting container and the second cooling and collecting container are shown in Tables 3 and 4. Tables 3 and 4 have suggested that the conversion of the fluorine gas was over 99% and bromine pentafluoride having a purity of 99% or more was collected in the second cooling and collecting container.

TABLE 4

| | Material collected in first cooling and collecting container (vol %) | | | Material collected in second cooling and collecting container (vol %) | | |
|---|---|---|---|---|---|---|
| | $BrF_3$ | $F_2$ | $BrF_5$ | $BrF_3$ | $F_2$ | $BrF_5$ |
| Ex. 20 | 71.0 | under 0.1 | 29.0 | under 0.1 | under 0.1 | over 99 |

REFERENCE SIGNS LIST

1: Reactor
2: Fluorine gas feeder
3 and 5: Inert gas feeder
4: Vaporizer
6: Bromine-containing compound
7: First cooling and collecting container
8: Adsorption tower
9: Second cooling and collecting container
11, 12, and 14: Mass flow controller
13: Heater
15: Pressure gauge
16: Pressure regulating valve
17: Fourier-transform infrared spectrophotometer 18: Ultraviolet-visible spectrophotometer
19 and 20: Cooling tank
21: Bromine trifluoride
22: Bromine pentafluoride

The invention claimed is:

1. A method for producing bromine pentafluoride, comprising:
a reaction step of feeding a bromine-containing compound, the bromine-containing compound being at least one of a bromine gas and bromine trifluoride, and a fluorine gas to a reactor to give a (fluorine atom):(bromine atom) molar ratio, that is, F/Br of 3.0 or more and 4.7 or less and reacting the bromine-containing compound and the fluorine gas to each other to obtain a reaction mixture containing bromine pentafluoride and bromine trifluoride; and
a separation step of separating bromine pentafluoride and bromine trifluoride in the reaction mixture from each other;
wherein the separation step includes a cooling step of cooling and separating the reaction mixture into a gas component containing bromine pentafluoride and a liquid-solid component containing bromine trifluoride; and
wherein the cooling step includes a first cooling step including cooling the reaction mixture in a temperature range of $-20°$ C. or more to not more than a melting temperature of the bromine trifluoride to collect the bromine trifluoride, and a second cooling step including cooling the bromine pentafluoride in the reaction mixture in a temperature range of $-80°$ C. or more to not more than melting temperature of the bromine pentafluoride to collect the bromine pentafluoride.

2. The method for producing bromine pentafluoride according to claim 1, wherein in the reaction step, an inert gas is fed to the reactor along with the bromine-containing compound and the fluorine gas to perform the reaction and the inert gas is fed in an amount of 50 vol % or more relative to the total gas volume of the bromine-containing compound, the fluorine gas and the inert gas.

3. The method for producing bromine pentafluoride according to claim 1, wherein the reaction is performed at a pressure of 0.1 MPa or more and 0.5 MPa or less.

4. The method for producing bromine pentafluoride according to claim 1, wherein the reaction is performed at a temperature of 100°° C. or more and 400° C. or less.

5. The method for producing bromine pentafluoride according to claim 1, wherein the reaction is performed by placing at least one of an oxide of a metal and a fluoride of a metal as a catalyst in the reactor and the metal is at least one of metals belonging to the Group III elements and the Group IV elements in a periodic table.

6. The method for producing bromine pentafluoride according to claim 5, wherein the catalyst is at least one selected from $Al_2O_3$, $NiF_2$, $FeF_3$, $CoF_2$, and $AlF_3$.

7. The method for producing bromine pentafluoride according to claim 1, wherein the reactor is a bright annealing tube made of nickel.

8. The method for producing bromine pentafluoride according to claim 1, wherein the separation step further includes an adsorption step of bringing the gas component containing bromine pentafluoride obtained by the cooling step into contact with an adsorbent and allowing bromine trifluoride mixed in the gas component containing bromine pentafluoride to be adsorbed by the adsorbent.

9. The method for producing bromine pentafluoride according to claim 8, wherein the adsorbent is a fluoride of at least one of metals belonging to the Group I elements and the Group II elements in the periodic table.

10. The method for producing bromine pentafluoride according to claim 8, wherein the adsorbent is at least one selected from LiF, NaF, KF, RbF, CsF, $MgF_2$, and $CaF_2$.

11. The method for producing bromine pentafluoride according to claim 2, wherein the reaction is performed at a pressure of 0.1 MPa or more and 0.5 MPa or less.

12. The method for producing bromine pentafluoride according to claim 2, wherein the reaction is performed at a temperature of 100° C. or more and 400° C. or less.

13. The method for producing bromine pentafluoride according to claim 3, wherein the reaction is performed at a temperature of 100° C. or more and 400° C. or less.

14. The method for producing bromine pentafluoride according to claim 2, wherein the reaction is performed by placing at least one of an oxide of a metal and a fluoride of a metal as a catalyst in the reactor and the metal is at least one of metals belonging to the Group III elements and the Group IV elements in a periodic table.

15. The method for producing bromine pentafluoride according to claim 3, wherein the reaction is performed by placing at least one of an oxide of a metal and a fluoride of a metal as a catalyst in the reactor and the metal is at least one of metals belonging to the Group III elements and the Group IV elements in a periodic table.

16. The method for producing bromine pentafluoride according to claim 4, wherein the reaction is performed by placing at least one of an oxide of a metal and a fluoride of a metal as a catalyst in the reactor and the metal is at least one of metals belonging to the Group III elements and the Group IV elements in a periodic table.

17. The method for producing bromine pentafluoride according to claim 2, wherein the reactor is a bright annealing tube made of nickel.

18. The method for producing bromine pentafluoride according to claim 3, wherein the reactor is a bright annealing tube made of nickel.

19. The method for producing bromine pentafluoride according to claim 4, wherein the reactor is a bright annealing tube made of nickel.

* * * * *